United States Patent
Kitchen et al.

(10) Patent No.: US 12,552,419 B2
(45) Date of Patent: Feb. 17, 2026

(54) AMMONIA CRACKING FOR MULTI-FUEL ENGINES

(71) Applicant: Cummins Power Generation Inc., Minneapolis, MN (US)

(72) Inventors: Andrew Guy Kitchen, Daventry (GB); Axel O. zur Loye, Columbus, IN (US)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 18/498,557

(22) Filed: Oct. 31, 2023

(65) Prior Publication Data
US 2025/0136155 A1    May 1, 2025

(51) Int. Cl.
| | | |
|---|---|---|
| *B61C 7/04* | (2006.01) | |
| *F02D 19/06* | (2006.01) | |
| *F02D 29/02* | (2006.01) | |
| *F02D 41/26* | (2006.01) | |
| *F02M 21/02* | (2006.01) | |

(52) U.S. Cl.
CPC ............ *B61C 7/04* (2013.01); *F02D 19/0618* (2013.01); *F02D 19/0644* (2013.01); *F02D 19/0671* (2013.01); *F02D 29/02* (2013.01); *F02D 41/26* (2013.01); *F02M 21/0206* (2013.01); *F02M 21/0224* (2013.01); *F02M 21/0227* (2013.01); *F02D 2200/701* (2013.01)

(58) Field of Classification Search
CPC ... B61C 7/04; F02D 19/0644; F02D 19/0671; F02D 19/081; F02D 41/0025; F02D 2200/701; F02M 21/0206; C01B 3/047
See application file for complete search history.

(56) References Cited

U.S. PATENT DOCUMENTS

| | | | |
|---|---|---|---|
| 4,478,177 A | 10/1984 | Valdespino | |
| 4,480,595 A * | 11/1984 | Hobby | F02M 25/12 123/3 |
| 4,495,930 A | 1/1985 | Nakajima | |
| 4,541,367 A | 9/1985 | Lindberg | |
| 4,546,732 A | 10/1985 | Mae et al. | |

(Continued)

FOREIGN PATENT DOCUMENTS

| | | |
|---|---|---|
| CN | 101538010 A | 9/2009 |
| CN | 102072036 A | 5/2011 |

(Continued)

OTHER PUBLICATIONS

GB Combined Search and Examination Report on GB Appl. Ser. No. 2415834.7, dated Mar. 12, 2025 (7 pages).

(Continued)

*Primary Examiner* — John M Zaleskas
(74) *Attorney, Agent, or Firm* — Foley & Lardner LLP

(57) ABSTRACT

A vehicle includes an engine to receive a cracked gas mixture. A cracker of the vehicle can receive ammonia and energy, crack the ammonia to form the hydrogen gas and a nitrogen gas, and convey the hydrogen gas to the engine. A controller for the vehicle can receive a predefined route for the vehicle. The controller can predict a future load demand of the vehicle based on the predefined route. The controller can adjust a flow rate of ammonia delivered to the cracker based on the future load demand.

20 Claims, 6 Drawing Sheets

(56) References Cited

U.S. PATENT DOCUMENTS

| | | | |
|---|---|---|---|
| 4,750,453 A * | 6/1988 | Valdespino | F02B 43/10 123/3 |
| 5,813,224 A | 9/1998 | Rao et al. | |
| 6,679,200 B2 | 1/2004 | Dingle | |
| 6,694,242 B2 | 2/2004 | Wong | |
| 6,845,608 B2 | 1/2005 | Klenk et al. | |
| 7,349,797 B2 | 3/2008 | Donnelly et al. | |
| 7,522,990 B2 | 4/2009 | Daum et al. | |
| 7,640,896 B2 | 1/2010 | Nazri | |
| 7,769,527 B2 | 8/2010 | Noda et al. | |
| 7,778,761 B2 | 8/2010 | Bockhoff et al. | |
| 7,789,047 B2 | 9/2010 | Kuroki et al. | |
| 7,974,774 B2 | 7/2011 | Kumar | |
| 8,206,470 B1 | 6/2012 | Jacobson | |
| 8,220,572 B2 | 7/2012 | Donnelly | |
| 8,370,049 B1 | 2/2013 | Shimizu et al. | |
| 8,495,974 B2 | 7/2013 | Agosta | |
| 8,534,237 B2 | 9/2013 | Iwatani et al. | |
| 8,561,578 B2 | 10/2013 | Miyagawa et al. | |
| 8,623,285 B2 | 1/2014 | Grannell et al. | |
| 8,645,047 B2 | 2/2014 | Daum et al. | |
| 8,655,519 B2 | 2/2014 | Cooper et al. | |
| 8,682,512 B2 | 3/2014 | Norton | |
| 8,691,182 B2 | 4/2014 | Grannell et al. | |
| 8,838,303 B2 | 9/2014 | Hatanaka | |
| 8,904,994 B2 | 12/2014 | Michikawauchi et al. | |
| 8,961,923 B2 | 2/2015 | Grannell et al. | |
| 8,977,469 B2 | 3/2015 | Gokhale et al. | |
| 9,151,232 B2 | 10/2015 | Kumar et al. | |
| 9,193,268 B2 | 11/2015 | Kumar | |
| 9,341,111 B2 | 5/2016 | Hikazudani et al. | |
| 9,695,758 B2 | 7/2017 | Coldren et al. | |
| 9,765,707 B2 | 9/2017 | Krug et al. | |
| 9,869,254 B2 | 1/2018 | Ahlinder | |
| 11,421,629 B2 | 8/2022 | Takeuchi | |
| 11,598,276 B1 * | 3/2023 | Klingbeil | F02D 35/023 |
| 11,905,897 B2 * | 2/2024 | Gallagher | B61C 5/00 |
| 2002/0177020 A1 | 11/2002 | Iio | |
| 2007/0142985 A1 * | 6/2007 | Kumar | B60L 15/2045 701/22 |
| 2007/0175459 A1 * | 8/2007 | Williams | F02D 41/025 123/515 |
| 2007/0219680 A1 * | 9/2007 | Kumar | B61L 25/026 701/19 |
| 2007/0233335 A1 * | 10/2007 | Kumar | G05B 13/021 701/22 |
| 2008/0121136 A1 | 5/2008 | Mari et al. | |
| 2008/0241033 A1 * | 10/2008 | Nazri | C01G 51/12 423/237 |
| 2008/0245318 A1 * | 10/2008 | Kuroki | F02D 19/0605 123/3 |
| 2009/0165761 A1 | 7/2009 | Fitchpatrick et al. | |
| 2010/0174484 A1 * | 7/2010 | Sivasubramaniam | B61L 27/16 701/469 |
| 2011/0257869 A1 * | 10/2011 | Kumar | F02D 41/1406 701/103 |
| 2011/0259285 A1 | 10/2011 | Michikawauchi et al. | |
| 2011/0283684 A1 * | 11/2011 | Aso | F02D 41/123 60/285 |
| 2011/0283959 A1 * | 11/2011 | Aso | F01N 3/30 123/3 |
| 2011/0283960 A1 * | 11/2011 | Hikazudani | B01J 23/42 123/3 |
| 2011/0293510 A1 | 12/2011 | Grannell et al. | |
| 2012/0148925 A1 * | 6/2012 | Grannell | F23D 14/62 429/408 |
| 2012/0167840 A1 * | 7/2012 | Miyagawa | F02D 19/0671 422/111 |
| 2012/0266846 A1 | 10/2012 | Kilbourne | |
| 2012/0310509 A1 | 12/2012 | Pardo et al. | |
| 2013/0158848 A1 * | 6/2013 | Gallagher | F02D 29/02 701/123 |
| 2013/0338901 A1 * | 12/2013 | Kumar | B61L 15/0058 701/102 |
| 2014/0074380 A1 | 3/2014 | Fisher et al. | |
| 2014/0311428 A1 * | 10/2014 | Miyagawa | F01N 3/106 123/3 |
| 2014/0365049 A1 * | 12/2014 | Cook | B61C 17/12 701/20 |
| 2014/0366840 A1 | 12/2014 | Sivasubramanian et al. | |
| 2015/0251676 A1 * | 9/2015 | Golden | B61L 27/20 701/19 |
| 2015/0377153 A1 * | 12/2015 | Gallagher | F02D 29/02 123/575 |
| 2016/0129925 A1 | 5/2016 | Jensen | |
| 2018/0223746 A1 * | 8/2018 | Mack | G01C 21/166 |
| 2018/0313282 A1 * | 11/2018 | Pati | F02D 41/1406 |
| 2018/0334177 A1 | 11/2018 | Myers | |
| 2019/0293004 A1 * | 9/2019 | Gallagher | F02D 19/081 |
| 2020/0207378 A1 * | 7/2020 | Lavertu | B61C 17/00 |
| 2020/0400086 A1 * | 12/2020 | Pati | G05D 1/0293 |
| 2021/0156321 A1 | 5/2021 | Yao et al. | |
| 2022/0003155 A1 | 1/2022 | Wibberley | |
| 2022/0025826 A1 * | 1/2022 | Gallagher | F02D 41/021 |
| 2022/0153252 A1 * | 5/2022 | Lavertu | B60W 20/12 |
| 2022/0162989 A1 * | 5/2022 | Cocks | F23R 3/36 |
| 2022/0162999 A1 * | 5/2022 | Cocks | F02C 3/22 |
| 2022/0163002 A1 * | 5/2022 | Takeuchi | F02M 27/02 |
| 2022/0170415 A1 * | 6/2022 | Homma | F02M 21/0209 |
| 2022/0170433 A1 * | 6/2022 | Takeuchi | F02M 21/06 |
| 2022/0193629 A1 * | 6/2022 | Kambara | F02D 19/0671 |
| 2022/0195919 A1 | 6/2022 | Akbari et al. | |
| 2022/0205415 A1 * | 6/2022 | Takeuchi | F02M 21/0206 |
| 2022/0333534 A1 * | 10/2022 | Smith | F02C 9/40 |
| 2023/0123561 A1 * | 4/2023 | Fisher | F02D 41/0027 123/525 |
| 2023/0175431 A1 * | 6/2023 | Klingbeil | F02D 41/0055 60/273 |
| 2023/0184181 A1 * | 6/2023 | Klingbeil | F02D 41/062 123/445 |
| 2023/0193841 A1 * | 6/2023 | Lavertu | F02D 31/002 |
| 2023/0235708 A1 * | 7/2023 | Lavertu | F02D 19/0644 701/99 |
| 2023/0415791 A1 * | 12/2023 | Pedder | B60W 10/06 |
| 2024/0018897 A1 * | 1/2024 | Zhou | F02D 19/024 |
| 2024/0043268 A1 * | 2/2024 | Wall, II | F02M 21/0227 |
| 2024/0044285 A1 * | 2/2024 | Wall, II | F02M 21/0206 |
| 2024/0191665 A1 * | 6/2024 | Spyra | F02P 5/1502 |
| 2024/0294377 A1 * | 9/2024 | Wall, II | F02M 21/0206 |
| 2025/0059927 A1 * | 2/2025 | Nakatani | F02M 21/02 |
| 2025/0067225 A1 * | 2/2025 | Nakatani | F02D 41/1454 |

FOREIGN PATENT DOCUMENTS

| | | |
|---|---|---|
| CN | 104005863 A | 8/2014 |
| CN | 104481711 A | 4/2015 |
| CN | 104675515 A | 6/2015 |
| CN | 105443241 A | 3/2016 |
| CN | 106704012 A | 5/2017 |
| CN | 112116156 A | 12/2020 |
| CN | 114183275 A * | 3/2022 |
| CN | 114370647 A | 4/2022 |
| CN | 114483387 A | 5/2022 |
| CN | 114562397 A | 5/2022 |
| CN | 115199442 A | 10/2022 |
| CN | 116039608 A * | 5/2023 |
| CN | 116624295 A * | 8/2023 |
| DE | 10 2022 130 827 A1 | 6/2023 |
| EP | 4 496 048 A1 | 1/2025 |
| JP | 2023-061545 A | 5/2023 |
| KR | 101501490 B1 | 3/2015 |

(56) References Cited

FOREIGN PATENT DOCUMENTS

WO     WO-2005/116418 A1    12/2005
WO     WO-2017/071538 A1     5/2017

OTHER PUBLICATIONS

Austrian Search Report and Office Action on AT Appl. Ser. No. A156/2024 Dated Jul. 28, 2025 (12 pages).

* cited by examiner

AMMONIA CRACKING FOR MULTI-FUEL ENGINES

BACKGROUND

The present disclosure relates generally to systems, devices, methods, and computer-readable storage media for use with multi-fuel engines. More specifically, the present disclosure relates to cracking of ammonia for use in multi-fuel engines, such as for vehicles.

SUMMARY

One embodiment relates to a vehicle that includes an engine configured to receive a cracked gas mixture, a cracker, an energy storage device, and a controller. The cracker can receive ammonia from an ammonia storage container and energy from an energy source; crack the ammonia to form cracked gas including hydrogen gas and a nitrogen gas; and convey the hydrogen gas to the engine. The energy storage device can provide the energy to the cracker. The controller can receive a predefined route for the vehicle; predict a future load demand of the vehicle based on the predefined route; and adjust a flow rate of ammonia delivered to the cracker based on the future load demand.

In some embodiments, the energy source includes a battery and exhaust heat, and the cracked gas mixture includes a hydrocarbon fuel. In some embodiments, the controller is configured to charge the battery based on the future load demand. In some embodiments, the battery is configured to receive the energy from a traction motor. In some embodiments, the predefined route includes an indication of a grade and a speed.

In some embodiments, the vehicle is one locomotive of a plurality of locomotives of a locomotive consist, employing a distributed power system; and the future load demand is based on a distribution of power between the plurality of locomotives by the distributed power system.

In some embodiments, the engine is configured to receive the ammonia; the vehicle includes a hydrogen storage container for the hydrogen gas intermediate to the cracker and the engine; and the controller is configured to adjust a flow rate of the ammonia received by the engine based on a quantity of the hydrogen gas in the hydrogen storage container.

One embodiment relates to a method for employing an ammonia cracker in a vehicle. The method can include receiving, by a controller of a vehicle, a predefined route. The method can include predicting, by the controller, a future load demand of the vehicle based on the predefined route. The method can include adjusting, by the vehicle, a flow rate of ammonia delivered to a cracker of the vehicle based on the future load demand. The method can include receiving, at the cracker, ammonia at the adjusted flow rate from an ammonia storage container and energy from an energy source. The method can include cracking, by the cracker, the ammonia to form a cracked gas including a hydrogen gas and a nitrogen gas. The method can include conveying, by the cracker, the hydrogen gas to an engine. The method can include combusting, by the engine, a cracked gas mixture including the cracked gas.

In some embodiments, the energy source includes exhaust heat and a battery configured to receive energy from a traction motor, and the cracked gas mixture includes a hydrocarbon fuel. In some embodiments, the method includes charging the battery based on the future load demand and thereafter conveying the energy, from the battery, to a resistive element thermally coupled to a reactor of the cracker. In some embodiments, the method includes separating, by the cracker, the hydrogen gas from the cracked gas. In some embodiments, the predefined route includes an indication of a grade and a speed, and the method includes determining a position of the vehicle relative to the predefined route, and adjusting a power generated by the engine responsive to the position.

In some embodiments, the method can include receiving, from a distributed power system, an indication of a distribution of power between a plurality of locomotives of a locomotive consist. The method can include determining the future load demand based on the distribution of the power. In some embodiments, the method can include combusting, by the engine, the ammonia; storing the hydrogen gas in a hydrogen gas storage container, intermediate to the cracker and the engine based on the future load demand; and adjusting the flow rate of the ammonia based on a quantity of the hydrogen gas stored and a state of the energy source.

One embodiment relates to a non-transitive computer readable medium. The medium includes instructions to cause a processor to receive a predefined route. The instructions can include instructions to predict a future load demand of a vehicle based on the predefined route. The instructions can include instructions to determine an adjusted flow rate of ammonia delivered to a cracker of the vehicle based on the future load demand. The instructions can include instructions to cause the cracker to crack the ammonia at the adjusted flow rate.

In some embodiments, the instructions can include instructions to charge the battery based on the future load demand. In some embodiments, the instructions can include instructions to cause the cracker to crack the ammonia to form a cracked gas including a hydrogen gas and a nitrogen gas. In some embodiments, the instructions can include instructions to cause the cracker to convey the hydrogen gas to an engine. In some embodiments, the instructions can include instructions to cause the engine to combust the hydrogen gas along with a hydrocarbon fuel.

In some embodiments, the instructions can include instructions to generate energy to charge the battery from a traction motor. In some embodiments, the predefined route includes an indication of a grade and a speed.

In some embodiments, an engine is configured to receive the ammonia, the vehicle includes a hydrogen storage container for hydrogen intermediate to the cracker and the engine; and the medium includes instructions to adjust a flow rate of the ammonia received by the engine based on a quantity of the hydrogen in the hydrogen storage container.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
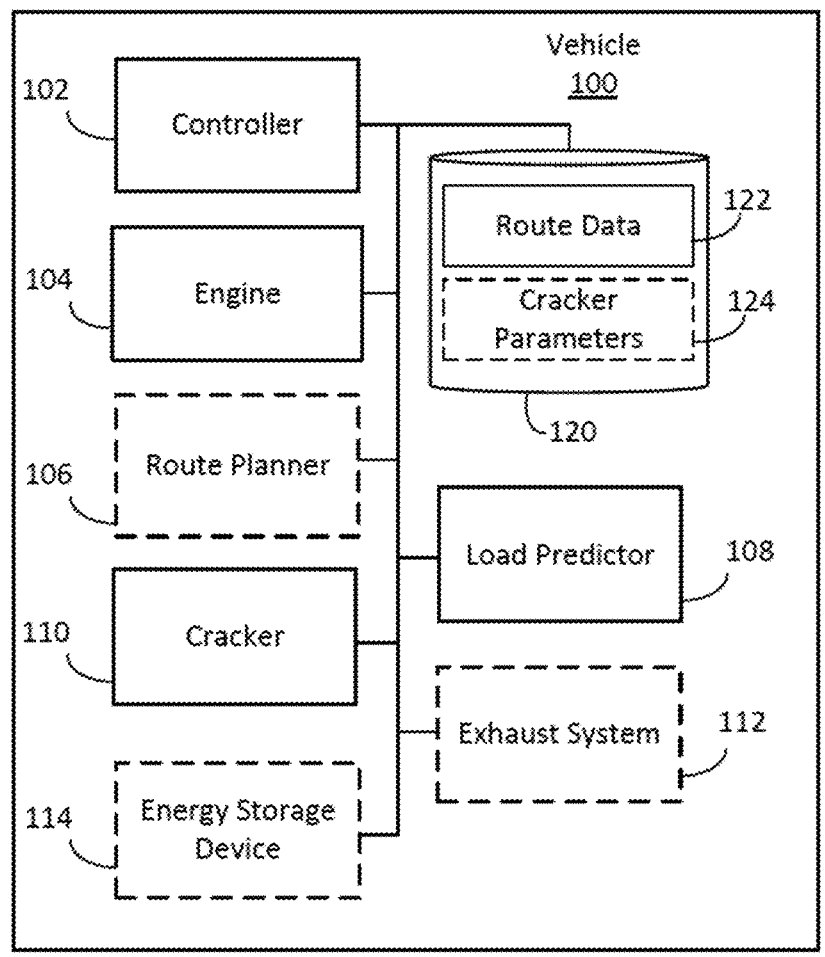
FIG. 1 is a block diagram of a vehicle including an engine coupled to a hydrogen injection system, according to some embodiments.

Following below are more detailed descriptions of various concepts related to, and implementations of, methods, apparatuses, and systems for a multi-fuel engine. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the figures generally, the various embodiments disclosed herein relate to systems, devices, methods, and computer-readable storage media for use with multi-fuel engines. Some embodiments may include predicting a future load of a vehicle, adjusting a present operation of various energy sources or sinks of the vehicle to reduce a total fuel usage, maintenance, cost, greenhouse gas emissions, vehicle performance, or the like. In some example embodiments of the present disclosure, a locomotive can travel along a route including a pre-defined path of travel, speed, elevation, or the like. The locomotive can include an engine which is fueled by (e.g., configures to receive) a cracked gas mixture. The cracked gas mixture can include an output of the cracker, which may be referred to as cracked gas, including hydrogen. In some embodiments, the cracked gas mixture can include nitrogen or ammonia vapor of the cracked gas, or the nitrogen or ammonia vapor can be removed therefrom. The cracked gas mixture may or may not include another fuel added to the cracker output such as ammonia or a hydrocarbon (e.g., diesel including bio-diesel, hydro-treated Vegetable Oil (HVO), gasoline, or natural gas,) in various concentrations, combinations thereof, or the like. For example, a multi-fuel locomotive can employ a combination of natural gas, diesel, and hydrogen, wherein the natural gas and diesel are constituent portions of the cracked gas mixture, and are combusted along with the hydrogen according to a value function. The various constituent portions of the cracked gas mixture can be provided through one or more fuel systems. For example, each of the diesel, natural gas, and hydrogen gas can include a separate fuel system to deliver the fuel to the engine.

In various embodiments, the various fuels, such as hydrogen, ammonia, or diesel, can contact each other prior to or upon entering the engine. For example, various constituent gasses, vapors, or liquid of the cracked gas mixture can come into contact in a fuel line, a manifold, intake port, a combustion chamber, etc. The composition of the cracked gas mixture can vary along a fuel delivery system or location. For example, at a cracker output, the cracked gas mixture can include hydrogen gas, nitrogen gas, and ammonia vapor. Diesel, ammonia, etc. may thereafter be added to the cracked gas mixture. Likewise, various constituent components, such as ammonia vapor or nitrogen gas, can be removed from the cracked gas mixture.

The engine can receive hydrogen gas ($H_2$) in various concentrations. For example, the vehicle can include a cracker to crack hydrogen from ammonia having an operating temperature defined by one or more thresholds. A controller of the locomotive can predict a future load demand of the locomotive, and adjust a current operating point of the locomotive based on the predicted future load. For example, a locomotive approaching an incline can adjust a throttle to a higher power notch, to increase the heat energy available to the cracker to a desired operating point (e.g., via resistive elements or hot exhaust gasses generated by the engine assembly) such that upon the locomotive reaching the incline, an appropriate reserve or production rate of hydrogen gas is available. A portion of the power may be used to charge an energy storage device. Embodiments described herein receive a route, predict a future load, and adjust the operation of the locomotive based on the predicted load.

As shown in FIG. 1, a multi-fuel vehicle 100 includes an engine 104, a cracker 110, an energy source, and a controller 102. The engine 100 is configured to receive a cracked gas mixture. The cracker 110 is configured to receive ammonia from an ammonia storage container and energy from an energy source. The cracker 110 is configured to crack the ammonia to form cracked gas including a hydrogen gas and a nitrogen gas. The cracker is configured to convey the hydrogen gas to the engine 104. The energy source is configured to provide the energy to the cracker 110. The controller 102 is configured to receive a predefined route for the vehicle 100. The controller 102 is configured to predict a future load demand of the vehicle 100 based on the predefined route. The controller 102 is configured to adjust a flow rate of ammonia delivered to the cracker based on the future load demand.

The cracker 110 can couple to an ammonia storage container via a fluidic coupling. For example, the fluidic coupling can include a delivery system for the ammonia, which is operatively coupled to the controller 102. The cracker 110 can couple to the engine 104 via a fluidic coupling. For example, the fluidic coupling can include a delivery system for hydrogen gas, or ammonia (e.g., ammonia vapor). The delivery system can convey hydrogen gas or ammonia to the engine 104, such as a combustion chamber thereof. The energy source can couple to the cracker 110 via an energetic coupling. For example, the energetic coupling can include an electrical coupling for an electrical energy source such as a battery or alternator. The energetic coupling can include a thermal coupling with an exhaust system 112 of the engine, such as via a heat exchanger. The controller 102 can couple to the cracker 110 via an operative coupling. For example, the controller 102 can include an operative connection (e.g., generate a control signal for) a valve to control a flow rate of ammonia, or a flow rate of exhaust gas. In some embodiments, the controller 102 can a control generate a control signal for a control circuit for electrical power provided to the cracker 110.

The vehicle 100 can include or interface with a controller 102 to execute operations to manage the performance of the systems and methods described herein. An engine 104, can generate tractive effort and electrical power. A route planner 106 can determine a route A load predictor 108 can predict a future load (e.g., hydrogen demand) based on the route. A cracker 110 can crack ammonia. An exhaust system 112 can direct heat generated by the engine 104. The exhaust system 112 can direct exhaust gases away from the engine 104. The heat from the exhaust gases can provide heat to the cracker 110. The vehicle 100 can include or interface with an energy storage device 114 to store the various energy sources of the vehicle 100 and a data repository 120 which can exchange and store data with or between the various components of the vehicle 100. For example, the energy source can include a battery and exhaust heat.

The vehicle 100 can be any type of on-road or off-road vehicle including, but not limited to, wheel-loaders, fork-lift trucks, line-haul trucks, mid-range trucks (e.g., pick-up truck, etc.), sedans, coupes, tanks, airplanes, boats, and any other type of vehicle. For example, the vehicle can be a locomotive configured to travel along a fixed path of travel. The vehicle 100 can be operated by an occupant thereof, an operator remote therefrom, or may be an autonomous vehicle (e.g., fully autonomous or partially autonomous).

The controller 102, engine 104, route planner 106, load predictor 108, cracker 110, exhaust system 112, or energy storage device 114 can each include or interface with at least one processing unit or other logic device such as a programmable logic array engine, or module configured to communicate with a data repository 120 or database. The controller 102, engine 104, a route planner 106, load predictor 108, cracker 110, exhaust system 112, energy storage device 114, or data repository 120 can be separate components, a single component, or part of the vehicle 100. The vehicle 100 and various components thereof can include hardware elements, such as one or more processors, logic devices, or circuits. For example, the vehicle can include one or more components or structures of functionality of computing devices depicted in FIG. 6.

The data repository 120 can include one or more local or distributed databases, and can include a database management system. The data repository 120 can include computer data storage or memory and can store one or more of route data 122, or cracker parameters 124. The route data 122 can include a path of travel, instructions for traversing the path of travel, or vehicle characteristics associated with the path of travel. The path of travel can include a grading of a path, elevation, track switches, a current or predicted weather condition of one or more portions of the path of travel, or other vehicles along the path that can be indicative of a modification to a previously determined path of travel (e.g., an indication that a path of travel can include transiting through a siding, etc.). The path of travel can include various speed restrictions or indications thereof such as an indication of a condition of the path (e.g., rough track). The instructions for traversing the path can include estimated speeds, speed restrictions, visibility, or a location of other vehicles or obstacles that can be relevant to vehicle operation (e.g., can result in speeding up or slowing down). Instructions for traversing the path can include limits to emissions (e.g., NOx, greenhouse gasses, audible noise, or the like). For example, the limits can be applicable to geo-fenced regions such as various municipalities, air quality regions, or the like. Attributes of the vehicle 100 relevant to the route can include a load pulled thereby (e.g., a tonnage or number of cars, or an attribute of other vehicles in a consist, such as power or location). For example, the vehicle can be one locomotive of a plurality of locomotives of a locomotive consist, employing a distributed power system. The future load demand can be based on a distribution of power between the plurality of locomotives by the distributed power system.

The cracker parameters 124 can include a quantity of available ammonia, various target temperatures or efficiencies, reaction completion based thereupon, or a flow rate-energy balance. The flow rate-energy balance can relate an input of energy to an output of a quantity of hydrogen gas produced. For example, for a given reactor (e.g., geometry, catalyst, volume, design, and the like), each unit of hydrogen can require an input power which can be expressed as a function of total energy provided to the ammonia, or an amount of electrical energy provided to the cracker 110 as a function of exhaust temperature, a quantity of hydrogen produced for a given exhaust temperature or energy input or so forth. The cracker 110 operation can include models depending on environmental conditions such as temperature, pressure, vehicle or wind speed, or the like. For example, the cracker parameters 124 can include one or more models of cracker operation, operable to predict a production of hydrogen based on an input of exhaust gas or electrical energy, or an amount of energy employed to generate a quantity of hydrogen.

The vehicle can include or interface with at least one controller 102. The controller 102 can include or interface with one or more processors and memory. The processor can be implemented as a specific purpose processor, an application specific integrated circuit (ASIC), one or more field programmable gate arrays (FPGAs), a group of processing components, or other suitable electronic processing components. The processors and memory can be implemented using one or more devices, such as devices in a client-server implementation. The memory can include one or more devices (e.g., random access memory (RAM), read-only memory (ROM), flash memory, hard disk storage) for storing data and computer code for completing the various operations described herein. The memory can be or include volatile memory or non-volatile memory and can include database components, object code components, script components, or any other type of information structure for supporting the various activities and information structures of the present disclosure. The memory can be communicably connected to the processor and include computer code or instruction modules for executing one or more processes described herein. The memory can include various circuits, software engines, and/or modules that cause the processor to execute the systems and methods described herein.

The controller 102 can include or be coupled with communications electronics. The communications electronics can conduct wired and/or wireless communications. For example, the communications electronics can include one or more wired (e.g., Ethernet, PCIe, AXI, or CAN) or wireless transceivers (e.g., a Wi-Fi transceiver, a Bluetooth transceiver, a NFC transceiver, or a cellular transceiver). The controller 102 can cause one or more operations disclosed, such as by employing another element of the vehicle 100. For example, operations disclosed by other elements of the vehicle can be initiated, scheduled, or otherwise controlled by the controller 102.

The controller 102 is structured to control, at least partly, the operation of the engine 104 and associated systems, such as the cracker 110, exhaust system 112, or energy storage device 114. Communication between and among the components can be via any number of wired or wireless connections. In one embodiment, a controller area network (CAN) bus provides the exchange of signals, information, and/or information. The CAN bus includes any number of wired and wireless connections. The controller 102 can be, include, or interface with one or more electronic control units (ECU). Because the controller 102 is communicably coupled to the systems and components of FIG. 1, the controller 102 is structured to receive information from one or more of the components shown in FIG. 1

The controller 102 can adjust fuel delivery to the vehicle based on a load demand. For example, the controller 102 can vary a substitution ratio of diesel fuel at varying loads. The substitution ratio may be, for example, a ratio of diesel fuel to a total fuel amount for the diesel fuel and a gas fuel including hydrogen gas or ammonia. In various embodiments, the substitution ratio can include or be based on a fraction, amount, rate, or so forth of one or more fuels. The substitution ratio can be defined as a ratio based on fuel mass flows, fuel volume flows, or fuel energy flows based on the lower heating values and flow rates of the fuels. According to some embodiments, at low loads, the controller 102 can substitute a relatively large fraction of diesel with hydrogen gas or ammonia to reduce a fuel cost or engine emissions, such as 30%, 50%, or 90%. The controller 102 can substitute a smaller portion of the diesel at another load to increase total power generation (e.g., 10%). The controller 102 can further cause an increase or decrease in energy storage of a battery, hydrogen reservoir, or other energy storage device 114. For example, the controller 102 can operate, initiate, employ, or adjust the various systems and methods described herein.

The controller 102 can execute instructions of a non-transient computer readable medium including the instructions stored thereon. The instructions can cause a (e.g., one or more) processor of the controller 102 to receive a predefined route. The instructions can cause the processor to predict a future load demand of the vehicle 100 based on the predefined route. The instructions can cause the processor to determine an adjusted a flow rate of ammonia delivered to a cracker 110 of the vehicle 110 based on the future load demand. The instructions can cause the processor to cause the cracker 110 to receive ammonia at the adjusted flow rate.

The instructions can cause the processor to cause the cracker 110 to crack the ammonia to form a cracked gas including a hydrogen gas and a nitrogen gas. The instructions can cause the processor to cause the cracker 110 to convey the hydrogen gas to an engine. The instructions can cause the processor to cause the engine to combust the hydrogen gas along with a hydrocarbon fuel. In some embodiments, the instructions can cause the processor to generate energy to charge the battery from a traction motor.

In some embodiments, the predefined route includes an indication of a grade and a speed. The instructions can cause the processor to predict the future load demand of the vehicle based on the grade and the speed. In some embodiments, the vehicle 100 is one locomotive of a plurality of locomotives of a locomotive consist employing a distributed power system. The instructions can cause the processor to predict the future load demand based on a distribution of power between the plurality of locomotives by the distributed power system.

In some embodiments, the instructions are configured to interface with an engine 104 configured to receive the ammonia. The vehicle 100 can include a hydrogen storage container for hydrogen intermediate to the cracker 110 and the engine 104. The instructions can include instructions to adjust a flow rate of the ammonia received by the engine 104 based on a quantity of the hydrogen in the hydrogen storage container.

The vehicle can include at least one engine 104. The engine 104 can include any internal combustion engine configured to receive hydrogen gas along with a cracked gas mixture. The cracked gas mixture can include ammonia. The cracked gas mixture can include a hydrocarbon fuel. For example, the hydrocarbon fuel can include gasoline, natural gas, or diesel. The engine can be a hybrid engine (e.g., a combination of an internal combustion engine and an electric motor) or any other suitable engine, such as a turbine, Stirling engine, or free piston engine. For example, the engine 104 can include a diesel-powered compression-ignition engine, or an ammonia-natural gas-diesel multi-fuel engine, which is configured to combust hydrogen received as $H_2$ along with the cracked gas mixture fuel including ammonia, natural gas, or diesel, each of which may be conveyed by a separate fuel system. In some embodiments, the engine can be configured to receive ammonia. For example, the engine can receive the ammonia into a combustion chamber, cylinder, manifold, intake port, compressor inlet, aftercooler, mixer, or the like. The engine can generate exhaust gas, which can be conveyed to the exhaust system 112 via a pressure gradient therebetween. The engine 104 can include an alternator coupled to the engine to produce electrical energy based on a mechanical rotation received therefrom, or a linear generator coupled to a free piston engine to produce electrical energy therefrom. For example, the alternator can be a main alternator, or alternate alternator of a locomotive. A locomotive can include a traction motor configured to generate electrical power from a mechanical rotation thereof (e.g., a dynamic brake), which can further generate electrical energy.

The vehicle can include or interface with at least one route planner 106. The route planner 106 can receive, generate, store, or convey a route for the vehicle (e.g., a predefined route). For example, the route can include a path of travel, indicated speed, and other route information, such as environmental conditions (e.g., temperature, pressure, relative humidity, wind speed and direction, or precipitation) which can relate to a power or efficiency of the engine 104, such as by varying an air density delivered to the combustion chamber thereof, or an exhaust temperature thereof, or it can relate to the operation of the vehicle, for example reduced vehicle speed due to precipitation. For example, an exhaust temperature or other engine operation characteristics can vary along a route according to a slope, turn angle, track roughness, air availability (e.g., tunnel operation), or the like.

The route planner 106 can receive or determine a position of the vehicle 100 relative to the (predefined) route. For example, the route planner 106 can determine a position based on an elapsed time, an operator input to a user interface, a message from another portion of the vehicle control system, or a wired or wireless signal (e.g., track signaling, cellular signal, or global positioning system (GPS)). The route planner 106 can determine a speed of the vehicle 100 by a same or varying source relative to the position. The route planner 106 can convey a route to the load predictor 108, including a future position or attribute (e.g., slope) based on the route data 122, such as the vehicle tonnage, or the route distance. The route planner 106 can determine a time to reach another point along the route, such as based on one or more current or predicted speeds.

The vehicle 100 can include or interface with at least one load predictor 108. The load predictor 108 can predict a future load demand of a vehicle 100 based on the predefined route (e.g., the various route data 122). For example, the load predictor 108 can predict a demand for power to increase based on an increase in grade of the route, an increase in a speed of the route, or a predicted action of another locomotive in a consist (e.g., based on a distribution of power between the plurality of locomotives by the distributed power system). Conversely, the load predictor 108 can predict a demand for power to decrease based on a decrease in grade of the route, a decrease in a speed of the route, or a predicted action of another locomotive in a consist. The load predictor 108 can predict a cessation of load demand (e.g., associated with an arrival at a destination) or an introduction of load demand (e.g., associated with an engine startup). The load predictor 108 can determine a demand based on the route data 122, such as the tonnage pulled by a locomotive, frictional losses, or inclines.

The load predictor 108 can predict a future hydrogen demand, ammonia demand, or diesel demand of an engine based on the future load demand. The load demand can include a pre-determined substitution ratio of hydrogen or ammonia based on the demand or based on various vehicle attributes (e.g., exhaust temperature, battery state, a geo-fenced region, or the like). For example, the load predictor 108 can, prior to startup of an engine, determine a demand for hydrogen (e.g., increased demand to reduce startup emissions, or decreased demand responsive to a prohibition on cracking ammonia within the geo-fenced region). A supply of hydrogen, ammonia, or the like can match a demand therefor. A (predicted) future supply of hydrogen, ammonia, electrical energy, exhaust gas or engine coolant quantity or temperature, or the like can exceed or fall short of the (predicted) future demand, whereupon the controller 102 can adjust the operation of the vehicle 100 such as by adjusting an energy flow such as charging or discharging a battery, adjusting a substitution ratio of diesel fuel, or the like. The system can apply a loss function to predictive models thereof, based on a difference between measured and detected values, which may improve a subsequent prediction along a same or different path. The adjusted energy flow can reduce a number of operative cycles of a cracker 110 between operational and non-operational states, which can increase a cracker efficiency, decrease cracker 110 wear or maintenance, or the like.

The vehicle 100 can include at least one cracker 110. The cracker 110 can receive ammonia from an ammonia storage container and energy from an energy storage device. The cracker 110 can include a heat exchanger to warm the ammonia, such as to evaporate liquid ammonia or raise a temperature of an ammonia gas. For example, the heat exchanger can exchange heat with ambient air which is warmer than at least −30° C., engine coolant (e.g., liquid coolant), or exhaust temperature, such as exhaust gas in excess of 200° C., such as about 400° C., about 500° C., or the like.

The cracker 110 can include a reaction chamber to refine the ammonia into constituent portions of hydrogen gas and nitrogen gas. The output of the cracker, which may be referred to as cracked gas, can include the hydrogen gas and nitrogen gas along with partially cracked ammonia (e.g., as vapor). The quantity and proportion of these outputs may vary based on a cracker temperature. The reaction chamber can include a catalyst to increase a rate of said reaction, such as ruthenium, cobalt, iron, nickel, alloys thereof, or the like. The reaction chamber can thermally couple with one or more resistive elements to heat the reaction chamber. For example, the resistive elements can combine with the heat exchanger to raise a temperature of the cracker 110 to an operational temperature. Because cracking the ammonia is endothermic, the cracker 110 can receive substantially more energy than is needed to initially raise the temperature of the ammonia to the reaction temperature. Such energy can be provided by any combination of the exhaust gas, and resistive elements. For example, in some embodiments, a heat exchanger can preheat the ammonia to or near a reaction temperature, and the resistive elements can maintain the temperature of the reaction chamber. A same or additional heat exchanger can transfer heat from generated hydrogen or nitrogen gas, to the incoming ammonia.

The cracker 110 can receive energy from energy sources including exhaust gases or other sources. For example, the cracker 110 can receive energy from an energy storage device 114, such as electrical energy to supply to the resistive elements to maintain a reactor temperature. For example, the controller 102 can receive a measured temperature from a temperature sensor or an inferred temperature from a model (e.g., based on a flow rate of ammonia), and increase or decrease a current to maintain a temperature at a target temperature, or within a target range. The cracker 110 can crack the ammonia to form cracked gas including hydrogen gas and nitrogen gas. In some embodiments, the cracker 110 can include a membrane or other separator to separate the nitrogen from the hydrogen. In some embodiments, the system can be configured to separate ammonia from the hydrogen-ammonia gas. The cracker 110 can convey the hydrogen gas to a combustion chamber of the engine 104, via one or more elements such as a pump, injector, reservoir, line, or the like. For example, the conveyed hydrogen gas can be substantially free of nitrogen gas or can include nitrogen gas as an inert gas. Likewise, the hydrogen gas can be substantially free of ammonia or can include some ammonia depending on, for example, a cracker temperature.

Although some exhaust gasses can be waste heat, the exhaust temperature can be employed by various (e.g., urea) after treatment systems or other emissions controls systems, turbos, blowers, or the like. The exhaust heat can be received from the exhaust system 112 pre-aftertreatment or post-aftertreatment. Thus, the exhaust can include various heaters such that the exhaust temperature is not waste heat from the engine. For example, resistive heating elements of the exhaust system 112 may pre-heat an oxidation catalyst. Moreover, the exhaust gas or engine coolant temperature or volume can be inadequate to maintain an operational temperature of the cracker 110, such that electrical power is provided to maintain a temperature thereof. This electrical power can increase a resistance to the rotation of the alternator, causing the engine to use additional fuel. Moreover, the heat exchanger can impose backpressure on the engine 104, further decreasing fuel economy. Thus, the operation of the cracker 110 at low or zero load can cause an increase to fuel use. The controller 102 can transition the cracker 110 between an operation and non-operational state to increase an overall fuel efficiency or emissions profile of the vehicle.

Transitioning the cracker 110 between operational and nonoperational states can impose stress on the unit (e.g., from thermal cycling) which can increase a maintenance interval, or lower an efficiency (e.g., via energy use while heating up or cooling down the reaction chamber). Thus, the controller 102 can adjust a flow rate of ammonia to extend an operational or non-operational state of the vehicle. For example, the controller 102 can cause the cracker 110 to operate at a flow rate of 1 unit during a time 2T, rather than at a flow rate of 2 units for a time 1T, based on demand predicted by the load predictor 108 (e.g., to continue cracker 110 operation during a brief halt, such as slowing through a siding). The controller 102 can assign a weight to a startup or stoppage of the cracker 110, which can be compared to a weight associated with fuel use (e.g., per gallon or dollar of fuel) or emissions (e.g., per ton of $CO_2$, NOx, particulate matter, or dollar amount associated therewith), to determine an operation of the vehicle based on emissions, fuel usage, and cracker operational cycles.

The vehicle 100 can include at least one exhaust system 112. The exhaust system 112 can include one or more exhaust flow paths to convey exhaust gasses through turbochargers, emissions control systems, heat exchangers, and the like before venting the exhaust gasses to an ambient environment. An exhaust flow path can include an aftertreatment system, which can include a heater. The heater can be any sort of external heat source that can be structured to increase the temperature of passing exhaust gas, which, in turn, increases the temperature of components in the aftertreatment system. For example, the heater can include an electric heater that draws power from a battery of the engine 104 (or, another electric source, such as an alternator, super-capacitor, etc.), which may increase a conversion efficiency of an aftertreatment system. The heater can be controlled by the controller 102 (e.g., turn on, turn off, turn to various degrees of power to change the heater output power, etc.). The heater can be positioned proximate to a desired component to heat the component (e.g., DPF) by conduction (and possibly convection and/or radiation). Multiple heaters can be used with the exhaust aftertreatment system, and each can be structured the same or differently (e.g., conduction, convection, radiation, etc.).

As described above, the exhaust system 112 can include one or more heat exchangers to heat ammonia prior to an entry to a reaction chamber of a cracker 110. The exhaust flow path can continuously or selectively pass through such heat exchangers (e.g., according to a position of various vents, baffles, plenums, or the like, responsive to controller 102 instructions).

The vehicle can include at least one energy storage device 114. An energy storage device 114 can include a storage container (e.g., fuel tank) to store a hydrocarbon (e.g., diesel). Various storage tanks can also be referred to as fuel tanks. The storage tank can include a fuel sensor such as a float, capacitive sensor, or other sensor to determine a quantity of diesel fuel in the storage tank. In some embodiments, the sensor can sense or infer a quantity of diesel consumed by the engine 104 and determine a remaining quantity based thereupon. The at least one energy storage device 114 can include a storage tank to store ammonia. A sensor can determine a quantity of ammonia fuel in the storage tank. The energy storage device 114 can include a hydrogen reservoir. A pressure, temperature, or other sensor can determine a quantity of hydrogen in the reservoir. An energy storage device 114 can include a battery, super capacitor, or the like to store electrical energy. A sensor (e.g., a voltage sensor, current sensor, etc.) can determine a battery state of charge. The various sensors associated with the energy storage devices 114 can be communicatively coupled to the controller 102 and configured to convey an indication of the energy stored therein (e.g., based on a quantity of fuel). The operation of the vehicle can include various transfers of energy between the energy storage devices 114, which is further described with regard to the energy flow diagram of FIG. 2. For example, the energy storage device can be configured to provide energy to the cracker.

Figure 2:
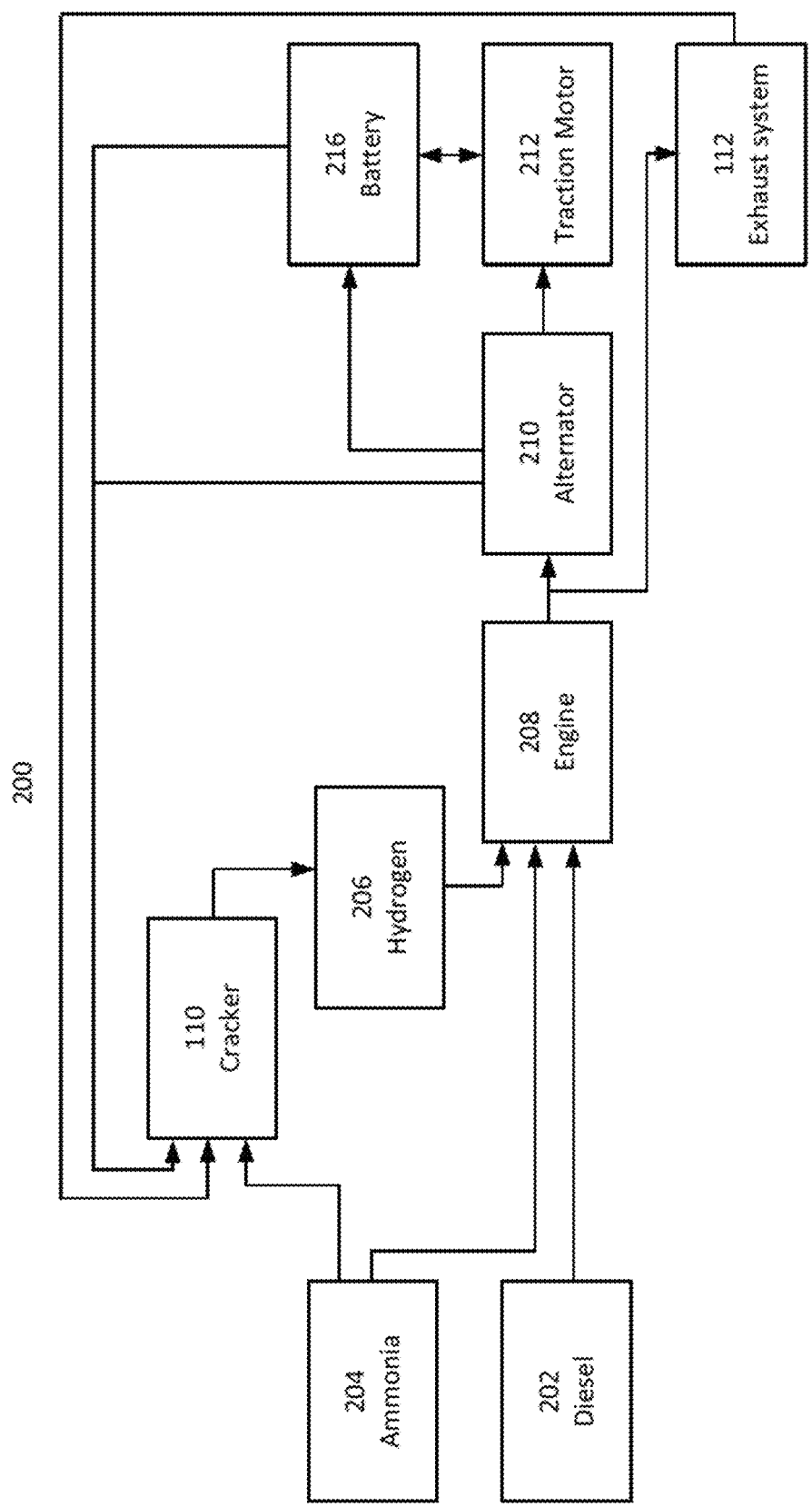
FIG. 2 is an energy flow diagram for a vehicle, such as the vehicle of FIG. 1, according to some embodiments.

Referring now to FIG. 2, an energy flow diagram 200 for a vehicle 100, such as the vehicle 100 of FIG. 1, is provided according to some embodiments. Each of a diesel fuel tank 202 and an ammonia storage container 204 (fuel tank) can supply fuel to an engine along one or more fuel lines (e.g., via fuel injection into a manifold port or combustion chamber, via one or more pumps, injectors, carburetors, mixers, or the like). According to various embodiments, particular fuels may be omitted, substituted, or modified. For example, as indicated above, the diesel fuel can be substituted for ammonia or various hydrocarbon fuels such as HVO, biodiesel, dimethyl ether (DME), or so forth. According to some embodiments, a vehicle can omit ammonia injection, or can preferentially supply hydrogen relative to ammonia.

For example, the vehicle can monitor combustion or power output with one or more sensors (e.g., a cylinder pressure sensor, flame speed sensor, optical sensor, ionization sensor, magnetostrictive sensor, vibration sensor, or RPM sensor) and adjust a ratio of fuels responsive to the combustion. The ammonia storage container 204 can further supply ammonia to the cracker 110, which can employ other energy received to crack, or partially crack the ammonia to form cracked gas including hydrogen, or a combination of hydrogen and ammonia (e.g., ammonia vapor).

As described above, the engine 208 can be configured to receive a hydrocarbon fuel and hydrogen gas into a combustion chamber thereof. For example, the hydrocarbon fuel may be delivered via direct injection, port injection to a manifold port, into the manifold, before the turbocharger, etc. The engine 208 can be configured to receive ammonia into the combustion chamber. For example, the engine 208 can combust any of the ammonia, diesel, or hydrogen (singly or according to any combination thereof) to generate mechanical force. For example, the engine can generate linear force by a lateral movement of a plurality of pistons, translate the lateral force to a rotational force of a crankshaft (e.g., via a piston rod coupled therebetween). The crankshaft can couple through various gears, drive shafts, chains, belts, or the like to connect to one or more alternators 210 to generate electricity. The engine 208 can exhaust post combustion gasses via the exhaust system 112, which, as described with regard to FIG. 1, can provide energy to the cracker 110, along with various treatment systems, turbos, blowers, or the like. For example, the exhaust gasses can increase a temperature of ammonia in the cracker 110 relative to ambient temperatures (e.g., via the heat exchanger).

The alternator 210 can couple to bus bars, cables, or the like to transport energy with various locomotive circuits to provide power to instruments, sensors, controllers 102, or the like. Particularly, the energy generated by the alternator 210 can be conveyed to a traction motor 212 to generate tractive effort to move the vehicle 100 along the route. The vehicle 100 can employ a traction motor 212 as a brake (e.g., regenerative braking) or to generate electrical energy therefrom (e.g., a dynamic brake). Such energy can be conveyed to one or more batteries 216, such as a battery 216 connected to the alternator 210 or cab electronics, or a different battery 216, or can be conveyed to a resistor grid (not depicted) and dissipated thereby (e.g., wherein a battery 216 is fully charged as for an extended descent). Likewise, a same or different battery 216 can supply energy to the traction motor 212 to propel the vehicle.

The electrical energy generated from any of the alternator 210, traction motor 212, or battery 216 can be conveyed to the cracker 110. For example, the cracker 110 can include a reaction chamber to crack ammonia, which is thermally coupled to resistive elements, whereby the resistive elements are supplied with the electrical energy. The reaction chamber can include various catalysts (e.g., ruthenium, cobalt, iron, nickel, alloys thereof, or the like), which can crack the ammonia at various respective temperatures. The reaction chamber, resistive elements, shrouds, or other material thermally coupled thereto can have a thermal mass which maintains a temperature. The controller 102 can convey energy, from the battery 216, to a resistive element thermally coupled to the reactor of the cracker. The cracking itself is endothermic such that the temperate of the chamber can drop during a reaction, according to a flow rate of ammonia through the reactor, along with heat radiated or conducted away from the reactor. Thus, a quantity of hydrogen produced by the cracker 110 can be limited by available electric energy, thermal energy (e.g., of a heat exchanger), a flow rate of ammonia and the like. Moreover, the controller 102 can minimize off-cycles of the cracker 110 (e.g., to reduce wear or increase efficiency, as described above), such that the controller 102 can maintain the cracker 110 in an operational or non-operational state to minimize transitions therebetween.

The vehicle can include a hydrogen reservoir 206 (which can also be referred to as a hydrogen storage container) for the hydrogen gas. The hydrogen storage container can be intermediate to the cracker 110 and the engine 208. The hydrogen reservoir 206 can include high pressure hydrogen fuel lines between the cracker 110 and the engine 208, wherein the quantity of the hydrogen can be varied according to a pressure and temperature stored therein. A compressor can pressurize the hydrogen in the hydrogen reservoir 206, and a valve can control a flow of hydrogen from the hydrogen reservoir 206. A separate hydrogen line, overpressure valve, or the like can bypass the pump to maintain the pressure of the hydrogen reservoir 206 in the case of a power loss thereto, or for any other reason that would make this advantageous. The hydrogen reservoir 206 can include a storage container coupled to the high pressure hydrogen fuel lines via a pressure regulator, such that the pressure of hydrogen can be varied between the fuel lines and the reservoir 206. The hydrogen reservoir 206 can include capacity to receive a substantially lower mass or energy relative to the ammonia storage container 204. For example, ammonia storage container 204 can include at least one order of magnitude greater mass than the hydrogen reservoir. Thus, the vehicle 100 can include a relatively large quantity of ammonia, which can be transported with a high volumetric energy density. The vehicle can include a relatively small quantity of hydrogen gas, which can be produced on demand, and can include a reservoir 206 to buffer some demand/supply imbalances. However, the reservoir 206 can be omitted or depleted by certain demand/supply imbalances, which can cause the cracker 110 to frequently cycle between operational and nonoperational states, or otherwise affect the operation of the vehicle such as a reduction in power, an increase in greenhouse gas emissions or pollutants, or an increase in fuel usage. Thus, the controller 102 can cause various adjustments to the energy flows provided herein.

The controller 102 can adjust various energy flows responsive to a present or future demand. For example, the controller 102 can receive a prediction of a future power demand of an engine, or a future hydrogen demand for the engine, from the load predictor 108. The hydrogen demand can correlate positively or negatively with the power demand. For example, an increase in power can be associated with a lower substitution ratio, and thus use less hydrogen, or use increased hydrogen to generate the additional power. Responsive to a future hydrogen demand, the load predictor 108 can predict a future engine power generated, which can cause an increase in electrical energy along with increased exhaust gasses. The load predictor 108 can determine that the traction motors or other vehicle circuits (e.g., cab electronics) can consume the electrical energy. The controller 102 can receive a present indication of the state of charge of the battery 216. The controller 102 can cause the engine 208 to generate more power, in advance of the load demand, to generate electrical energy which is stored by the battery 216 and thereafter provided to the cracker 110 during a high load condition (e.g., to crack ammonia which has been heated by the exhaust gasses). For example, the controller 102 can determine the future amount of energy needed based on a predicted future exhaust gas or engine coolant temperature (e.g., can decrease an amount of energy based on a higher temperature of ammonia received at a reactor of the cracker 110, or increase an amount of energy based on an increased quantity of ammonia provided to the reactor at a pre-reaction temperature, according to various cracker designs).

The controller 102 can determine an amount of hydrogen demand (e.g., time period or quantity). The controller 102 can determine a ratio of un-cracked ammonia delivered to the engine to control combustion properties of one or more fuels in a combustion chamber thereof. The controller 102 can determine an ammonia flow rate based on the amount of hydrogen demand. Various potential flow rates are depicted in FIG. 3.

Figure 3:
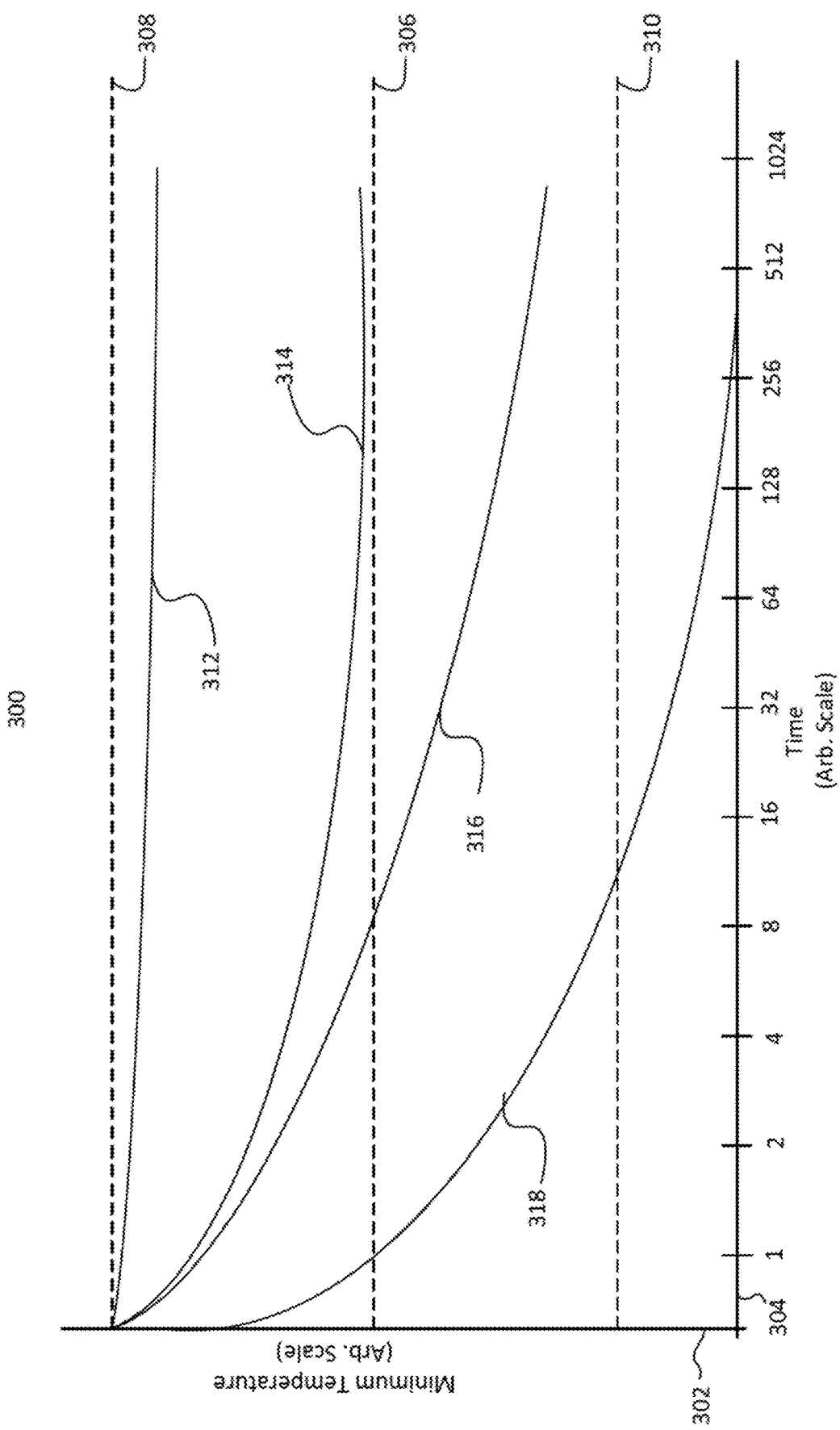
FIG. 3 is a minimum temperature diagram for various flow rates of a cracker, according to some embodiments.

Referring now to FIG. 3, a minimum temperature diagram 300 for various flow rates of a cracker 110 is provided, according to some embodiments. The minimum temperature diagram 300 provides a temperature axis 302 according to an arbitrary scale. At least one target temperature such as a first target temperature 306, or a target temperature range including an upper threshold 308 or a lower threshold 310 are depicted. The temperature values can vary according to a geometry, catalyst, or other properties of the cracker 110. For example, a target temperate can include values greater than 400° C. and less than 800° C. A temperature of the cracker 110 can be maintained at a first target temperature 306 or within the bounds of an upper threshold 308 or a lower threshold 310 by varying the electrical power supplied to resistive elements of the cracker 110, or the flow or temperature of exhaust gasses (e.g., by varying the operation of either of the engine 208 or the exhaust system 112). For example, a bypass system or other valve can control a quantity of exhaust gas passed through a heat exchanger.

For low flows of ammonia, the cracker 110 can increase cost or greenhouse gasses, such as because the engine 208 burns more fuel to heat the cracker 110 than is saved via substitution. For example, for some vehicles, cracker operation at 1 liter per hour can consume more energy than is saved, thus the cracker 110 can shut off for no or low load situations. For high flows of ammonia, the cracker 110 may not be able to receive enough thermal energy via the exhaust system 112 and resistive elements to support such a flow. Thus, cracker 110 operation can include a first band of steady-state flow rates, wherein the cracker 110 operates continuously about the first target temperature 306 and varies the engine operation to maintain a supply of electricity to the cracker 110. For example, the controller 102 can employ the first flow rate 312 at the depicted first target temperature 306 over time, as depicted by the time axis 304, by arbitrary units (e.g., minutes, seconds, hours, etc.).

In some embodiments, the controller 102 can increase a starting temperature of the cracker 110 to increase a flow rate of ammonia in excess of a steady state value (e.g., gradually cool the cracker 110 according to a thermal mass thereof), which can enable generating more hydrogen than during steady state operation (e.g., to increase hydrogen delivery to an engine 208 or increase a quantity of hydrogen stored in a hydrogen reservoir). For example, the controller 203 can select the depicted first flow rate 312 to decrease a temperature of the cracker 110 below an initiation point. The controller 102 can select the depicted second, higher, flow rate 314 to maintain a flow rate at the first target temperature 306 or within the bounds of the upper threshold 308 and lower thresholds 310. The controller 102 can select a third, larger still flow rate to maintain the temperature within the depicted target range, or above the depicted first target temperature 306 for a time which is less than about 8 units of time, as depicted. For example, the controller 102 can receive an indication that available electricity will be demanded by traction motors 212 in about 8 units of time, and generate a maximum amount to hydrogen by selecting the third flow rate 316. In another example, the controller 102 can receive an indication that demand for hydrogen will drop, and thus the cracker 110 can shutoff, but a hydrogen reservoir 206 can be filled in 8 units of time, which can extend an off-period of the cracker 110 before a subsequent startup. Likewise, the controller 102 can select the fourth flow rate 318 to maintain the temperature above the first target temperature for about 1 unit of time or above the lower threshold 310 for about 300 units of time. Thus, based on a predicted length or amount of future hydrogen demand, the controller 102 can select a current ammonia flow rate.

Figure 4:
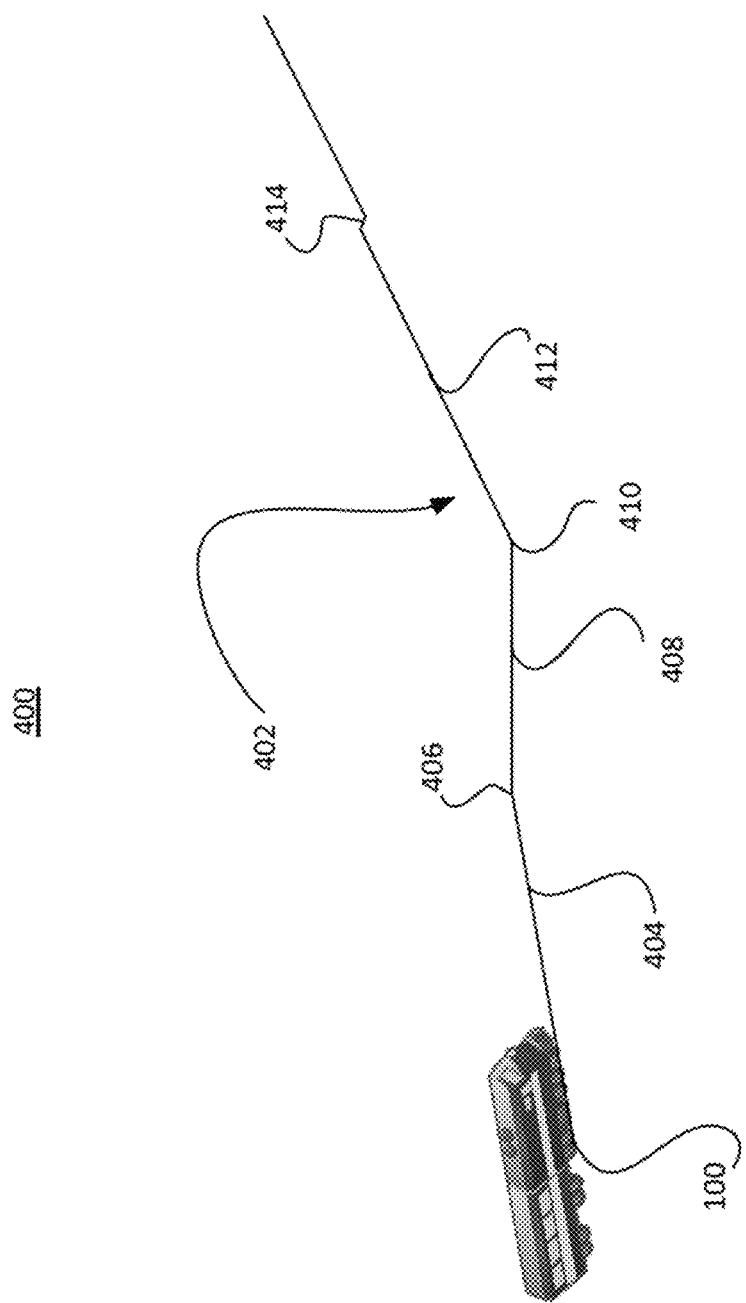
FIG. 4 is a route diagram for a vehicle, such as the vehicle of FIG. 1, according to some embodiments.

Referring now to FIG. 4, a route diagram 400 for a route 402 is provided, according to some embodiments. According to the route diagram 400, a vehicle 100 is disposed along a route 402. The depicted route 402 depicts a slope at various points along the route 402. Various routes 402 can include further information such as track conditions, vehicle speeds, or the like; such information is omitted merely for clarity and simplicity of the route diagram 400. For example, the depicted route 402 can relate to a predicted engine notch, or energy flow, rather than to a literal depiction of a slope. The controller 102 can perform similar operations to those described herein with respect to predicted vehicle speed, track conditions, or the like. Moreover, routes 402 can include gradual ascents, descents, curves, and the like, rather than the discrete sections of sloped track depicted. The controller 102 can perform similar options with such routes 402 based on load prediction associated with such routes 402.

A first portion 404 of the route 402 extends a distance before decreasing in slope at the first transition 406. The route planner 106 can receive an indication of the first transition 406 to a second portion 408, and based thereupon, the load predictor 108 can predict an overall power demand, and a portion of that power generated based on diesel, ammonia, or hydrogen. For example, the demand for ammonia can fall below a threshold such that the cracker 110 can shut off for an extended period of time. In advance of an arrival at the first transition 406, the controller 102 can cause an increase in a flow rate of ammonia to the cracker 110 to cause the cracker 110 to generate hydrogen to fill the hydrogen reservoir 206 to capacity, such that upon cracker 110 shutoff, the a maximum capacity of hydrogen can continue to be employed, and which can, according to certain routes 402, reduce a number of transitions of a cracker between an operational and non-operational state.

The vehicle 100 can proceed over the first transition 406 to the second portion 408. Prior to arrival at a second transition 410 to a third portion 412 of the route 402, the vehicle 100 can determine that the engine 208 will provide further exhaust gas or exhaust gas of a higher temperature to the exhaust system 112 while traversing the third portion, and that the cracker 110 can be employed during the ascent. Prior to arrival at a second transition 410, the controller 102 can cause an increase in electrical production, which can be stored in the battery 216 for cracking ammonia during the route 402, or to heat the reactor to an operating temperature in advance of the arrival at the second transition point 410.

The vehicle 100 can proceed over the second transition 410 to the third portion 412, operating the cracker 110 to generate and inject hydrogen gas to the combustion chamber of the engine. A discontinuity 414 (e.g., switchback or siding) can include a brief reduction in demand. In advance of reaching the discontinuity 414, the controller 102 can cause the cracker 110 to adjust a flow rate of ammonia, or the engine to adjust an injection rate of hydrogen. Thereafter, while traversing the discontinuity 414, the vehicle 100 can maintain an operation of the cracker 110. For example, responsive to a depletion of a hydrogen reservoir 206, the vehicle can maintain the vehicle at a same power level (e.g., notch), which can cause a continuous provision of exhaust gas to the cracker 110, and employ electrical energy not used at the traction motors to recharge batteries, such as where the battery is configured to receive the energy from a traction motor (e.g., the controller 102 can be configured to charge the battery based on a future load demand), and operate the cracker 110 reactor during the discontinuity to avoid an operational cycle thereof.

Figure 5:
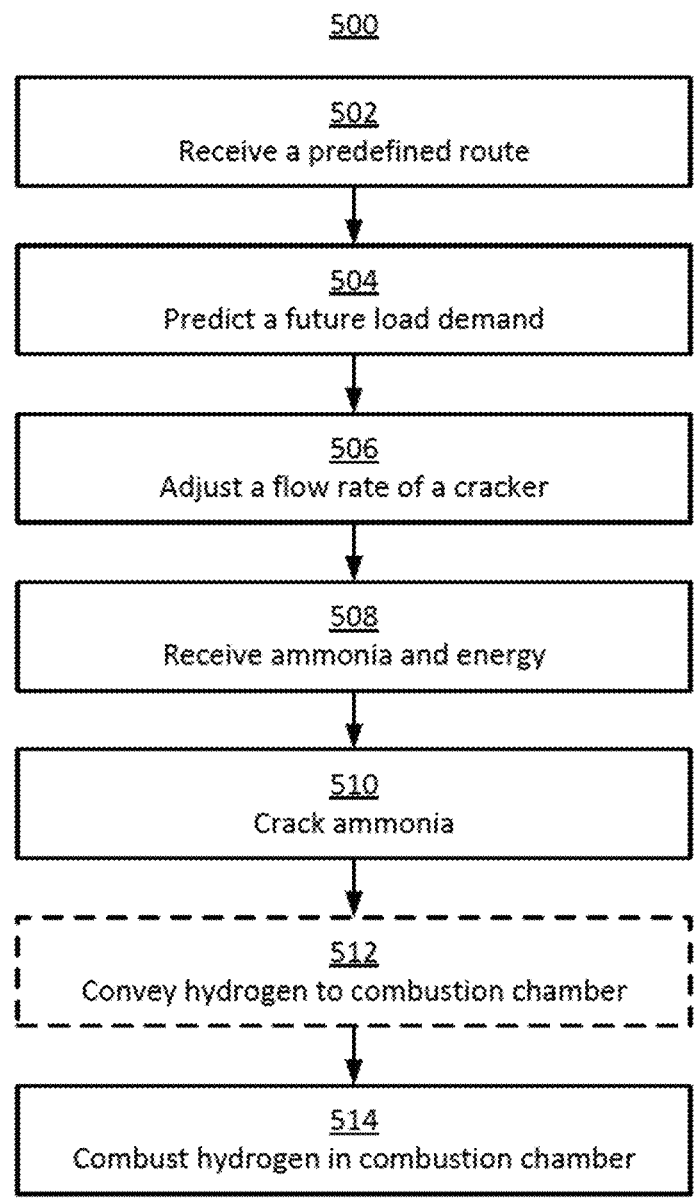
FIG. 5 is a flow diagram of a method of operation of the vehicle of FIG. 1 according to some embodiments.

Referring now to FIG. 5, a flow diagram of a method 500 of operation of a vehicle is provided, according to some embodiments. In brief summary, at operation 502, a controller 102 receives a predefined route 402. The predefined route 402 can include a known or predicted route. At operation 504, the controller 102 predicts a future load based on the predefined route 402. At operation 506, the controller 102 adjusts a flow rate of ammonia delivered to the cracker 110 based on the future load demand. At operation 508, the cracker 110 receives ammonia at the adjusted flow rate from an ammonia storage container and energy from an energy source. The cracker 110 cracks the ammonia to form a cracked gas including a hydrogen gas and a nitrogen gas at operation 510. The cracker 110 can convey hydrogen to a hydrogen reservoir at operation 512. The cracker 110 conveys hydrogen to the engine at operation 514. For example, the cracker 110 can convey the hydrogen to a combustion chamber of the engine 104. At operation 516, the engine combusts the hydrogen gas.

The controller 102 can adjust the flow rate, at operation 506, via an operative coupling between the controller 102 and an ammonia storage container. For example, the controller 102 can include an operative connection (e.g., generate a control signal for a valve) to control a flow rate of ammonia, or a flow rate of exhaust gas. In some embodiments, the controller 102 can a generate a control signal for a control circuit for electrical power provided to the coupling. The cracker 110 can receive the ammonia via a fluidic coupling. The cracker 110 can receive the ammonia, at operation 508, via a fluidic coupling with an ammonia storage container. For example, the fluidic coupling can include a delivery system for the ammonia, which is operatively coupled to the controller 102. The cracker 110 can couple to the engine 104 via a fluidic coupling. The fluidic coupling can include a delivery system to convey hydrogen gas to the engine. The hydrogen gas can include other gasses (e.g., may be a part of a cracked gas mixture).

The provided operations are not intended to be limiting. Additional, fewer, or different operations can be employed according to various embodiments. For example, in some embodiments, the operation of receiving, at the cracker 110, the energy from an energy source includes receiving, at the cracker 110, the energy from at least one of exhaust heat or a battery 216 configured to receive energy from a traction motor 212. The operation can further include combusting the cracked gas mixture including a hydrocarbon fuel.

In some embodiments, the method 500 includes charging the battery 216 based on the future load demand and thereafter conveying the energy, from the battery 216, to a resistive element thermally coupled to a reactor of the cracker 110.

In some embodiments, the method 500 includes separating, by the cracker 110, the hydrogen gas from the cracked gas.

In some embodiments, the predefined route includes an indication of a grade and a speed. The method 500 can include determining a position of the vehicle 100 relative to the predefined route. The method 500 can include adjusting a power generated by the engine 104 responsive to the position.

In some embodiments, the method 500 includes receiving, from a distributed power system, an indication of a distribution of power between a plurality of locomotives of a locomotive consist. The method can include determining the future load demand based on the distribution of the power.

In some embodiments, the method 500 includes combusting, by the engine 104, the ammonia. The method 500 can include storing the hydrogen gas in a hydrogen gas storage container 206, intermediate to the cracker 110 and the engine 104 based on the future load demand. The method 500 can include adjusting the flow rate of the ammonia based on a quantity of the hydrogen gas stored and a state of the energy source.

Referring again to operation 502, the controller 102 can receive a predefined route 402 for the vehicle 100. For example, the predefined route 402 can specify or otherwise include an indication of a grade and a speed (e.g., speed restriction), along with a turn, distance, or so forth. That is, the predefined route can include an indication of a grade and a speed. The controller 102 can receive the route 402 from another component of the vehicle 100, another processor in network communication with the controller 102 (e.g., as server or dispatch office), etc. A throttle position, engine notch, horsepower, or other indication of an operation of the vehicle can be included in or derived from the predefined route 402. The controller 102 can compare the route 402 to a present position of the vehicle 100 to determine a distance, time, or other indicia of between the vehicle and a point along the route 402.

Referring again to operation 504, the controller 102 can predict a future load based on the route 402. For example, the future load can include a power demand based on (e.g., derived from) information received by the route planner 106. The load predictor 108 can predict a total horsepower, or a portion thereof derived from hydrocarbon fuel, ammonia injection, hydrogen injection, or the like. The load predictor 108 can predict a load which corresponds to a value function, which can include a weight for one or more of a fuel cost, greenhouse gas emission, particulate matter output, $NO_x$ output, flame speed, cylinder pressure, or the like.

An optimization routine can determine a set of outputs corresponding to a value of the value function. For example, the optimization routine can determine a global or a local maximum or minimum of the value function. The optimization routine can determine the maximum or minimum according to a regression, genetic algorithm, or other optimization technique. Thus, the optimization routine can determine an optimized solution based on the value function corresponding to, for example, a best compromise between fuel cost, NOx emissions, greenhouse gas emissions, audible noise, etc.

The load predictor 108 can predict a demand for hydrogen based on a total power demand and a substitution ratio. The substitution ratio can vary based on atmospheric conditions (e.g., air density received into the engine), the power demanded, a geo-fenced regions, or the like. The load predictor 108 can predict the load based on a present condition of the vehicle. For example, a present horsepower demanded to pull a given tonnage at a first slope can be predictive of a future horsepower to pull the tonnage along a second slope. Moreover, the present condition of the vehicle can include a quantity of electrical energy or fuel (e.g., hydrogen, ammonia, diesel) stored by the locomotive. For example, the vehicle can halt operation of the cracker responsive to a lack of ammonia, or increase a substitution ratio responsive to a limited quantity of diesel.

Referring again to operation 506, the controller 102 can adjust a flow rate of the cracker 110. For example, the controller 102 can increase or decrease a supply of ammonia to the cracker 110, based on the predicted demand (e.g., the future load). Incident to or along with the adjusted flow rate, the controller 102 can adjust various energy flows of the vehicle. The controller 102 can cause the engine 104 and exhaust system 112 to increase or decrease a temperature of exhaust gas (e.g., to pre-condition the ammonia). For a given power level, the controller 102 can determine an engine speed and a torque value corresponding to this power level. Optimizing the torque and engine speed for a given power level can result in a higher engine efficiency, higher exhaust function, or other value to maximize a value function, such as a value function which includes a longitudinal component over time. In various embodiments, the value function can include an output value which depends on various input parameters which can include, as mentioned above, fuel cost or an output of NOx, greenhouse gasses, audible noise, or the like. The various input parameters can include various weights (e.g., positive or negative value weights) selected according to an implementation or use, or the value function can be a more complicated function, such as a combination of polynomials, exponentials, and trigonometric terms. Ultimately, the value function has the form of "value=$f(x_1, x_2, \ldots, x_n)$". The controller 102 can charge or discharge a battery 216 (e.g., to modulate engine load, or to generate electrical energy for provision to the cracker 110).

In some embodiments the controller 102 can inhibit a startup or shutdown of the cracker 110, such as based on a future demand of a quantity below a threshold, wherein a benefit from starting up or shutting down the cracker 110 can be less than the benefit of maintaining continual operation. The benefit can include a decrease in fuel use or pollutants, or a reduction of wear on the cracker 110, fewer battery cycles, or the like. For example, the controller 102 can compare weights or costs of a cost function to determine a desired outcome based on pollution, fuel use, and operational cycles of the cracker 110.

Referring again to operation 508, the cracker 110 receives ammonia and energy. For example, the ammonia can be received via the ammonia storage container 204 at an inlet of the cracker 110, and the energy can be received via exhaust gasses or electrical power (to be converted to heat in resistive elements of the locomotive). Either of the exhaust gasses or resistive elements can include or overlap with other components of the vehicle 100. For example, the resistive elements can be coupled to a dynamic brake system such that the employment of the dynamic brake can aid to generate hydrogen, or the exhaust gas can include various heaters as part of an after treatment system (e.g., selective catalytic reduction (SCR) after treatment, catalytic converter, etc.). The energy can be sourced from the traction motor 212, the battery 216, the output of the engine 104, etc. For example, the operation of the traction motor 212, the battery 216, or the engine 104 can be modulated to generate the electrical energy (e.g., mechanical energy can be converted into electrical energy, or a state of charge can be drawn down). The battery can be configured to receive the energy from a traction motor. The cracker 110 can receive the ammonia and energy responsive to instructions of the controller 102 to cause the cracker 110 to "pull" the energy or ammonia, or another component to "push" energy or ammonia to the cracker 110. According to various embodiments, the cracker 110 can receive energy according to any combination of electrical energy for resistive elements or thermal exhaust gasses. For example, some embodiments or modes of operation can receive only exhaust gasses, while others can only employ electrical energy to crack the ammonia. For example, in an engine off-state of a hybrid engine, the cracker 110 can employ purely electrical energy such that hydrogen can be available at a startup of a combustion engine.

Referring again to operation 510, the cracker 110 cracks the ammonia to generate cracked gas including hydrogen gas and nitrogen gas. For example, the cracker 110 can pass vaporized ammonia over a heated catalyst to generate the gasses. In some embodiments, a membrane or other separator can separate the nitrogen gas from the hydrogen gas such that a gas delivered to the combustion chamber contains a greater than a 3:1 molar ratio of hydrogen to nitrogen gas. The cracking of the ammonia can be incomplete such that at least a portion of ammonia entrained with the hydrogen gas can proceed along therewith, or the cracker 110 can include a separator to vent unconverted ammonia to an atmosphere or return the ammonia vapor to ammonia storage, or convey the ammonia to the engine for combustion. For example, the cracker may provide a greater ammonia to hydrogen ratio to the engine than other systems (e.g., fuel cell systems) may operate with. The cracker 110 can include one or more sensors indicative of a temperature of inlet ammonia, outlet gas, or a reaction chamber thereof. The controller 102 can adjust the energy supplied to the cracker 110 based on the indication of the temperature received therefrom, which can maintain cracker 110 operation within a desired temperature range or at a desired temperature.

The cracker 110 conveys hydrogen to a hydrogen reservoir 206 at operation 512. For example, the cracker 110 can convey the hydrogen to hydrogen lines or a hydrogen storage tank 204. The hydrogen lines or a hydrogen storage tank 204 can be intermediated from the cracker 110 by a compressor, valve, or the like. For example, the controller 102 can actuate the valves or compressor to maintain a target pressure range of the hydrogen reservoir 206.

Referring again to operation 514, the cracker 110 conveys the hydrogen gas to the combustion chamber of the engine. For example, the cracker 110 output can couple to the input of the combustion cylinder (e.g., via the hydrogen reservoir 206 and any valves, compressors, or the like), such that the controller 102 can control the injection of hydrogen into the cylinder by changing energy or ammonia delivered to the cracker 110 in real time or near real time (e.g., according to energy stored in a battery 216 or various mechanical systems such as traction motors 212). In some embodiments the conveyance of the hydrogen gas from the cracker 110 to the combustion cylinder can traverse one or more pumps, valves, injectors, or other devices operatively coupled to the controller 102 such that the controller 102 can adjust a quantity of hydrogen gas generated by the cracker 110 separately from (e.g., selectively time-shifted, relative to) the combustion of the hydrogen discussed henceforth, at operation 516. Put differently, the controller 102 can adjust a flow rate of the hydrogen gas delivered to the engine based on the future load demand. In some embodiments, the controller 102 is configured to adjust a flow rate of ammonia received in the engine (e.g., the combustion chamber) based on a quantity of hydrogen in the hydrogen reservoir, a state of charge of the battery, or a quantity of ammonia in the ammonia storage container. The controller 102 can adjust a flow of hydrogen, ammonia, or a hydrocarbon fuel to the engine 104 to control a flame speed or combustion rate of the combustion of the fuel.

The controller 102 can adjust the flow rate of hydrogen delivered to the engine based on future demand. For example, responsive to a decreased future demand, the engine can decrease the flow rate to a minimum to extend the operation of the cracker 110, or increase the flow rate associated with a higher substitution ratio of hydrogen gas at a different load and speed. Responsive to an increased future demand, the controller 102 can cause an increase in hydrogen delivered to the engine to deplete a reservoir prior to the increase in demand, or a decrease to reserve hydrogen gas for the future demand.

Referring again to operation 516, the engine combusts the hydrogen. The combustion of the hydrogen (along with any hydrocarbon or ammonia) can generate a linear force of a piston, which is translated into rotational energy of a crankshaft coupled to an alternator 210. The combustion of the hydrogen can thus generate further exhaust gas or electrical energy for provision to the cracker 110. Moreover, the combustion of the hydrogen can be associated with less carbon dioxide or pollutants relative to hydrocarbon fuel (e.g., NOx, particulate matter, or the like). The exhaust temperature for the hydrogen gas can vary from a hydrocarbon fuel such that the controller 102 can predict a future exhaust temperature or exhaust flow rate based on a quantity of combusted hydrogen, along with an engine speed, torque demand, and so forth.

Figure 6:
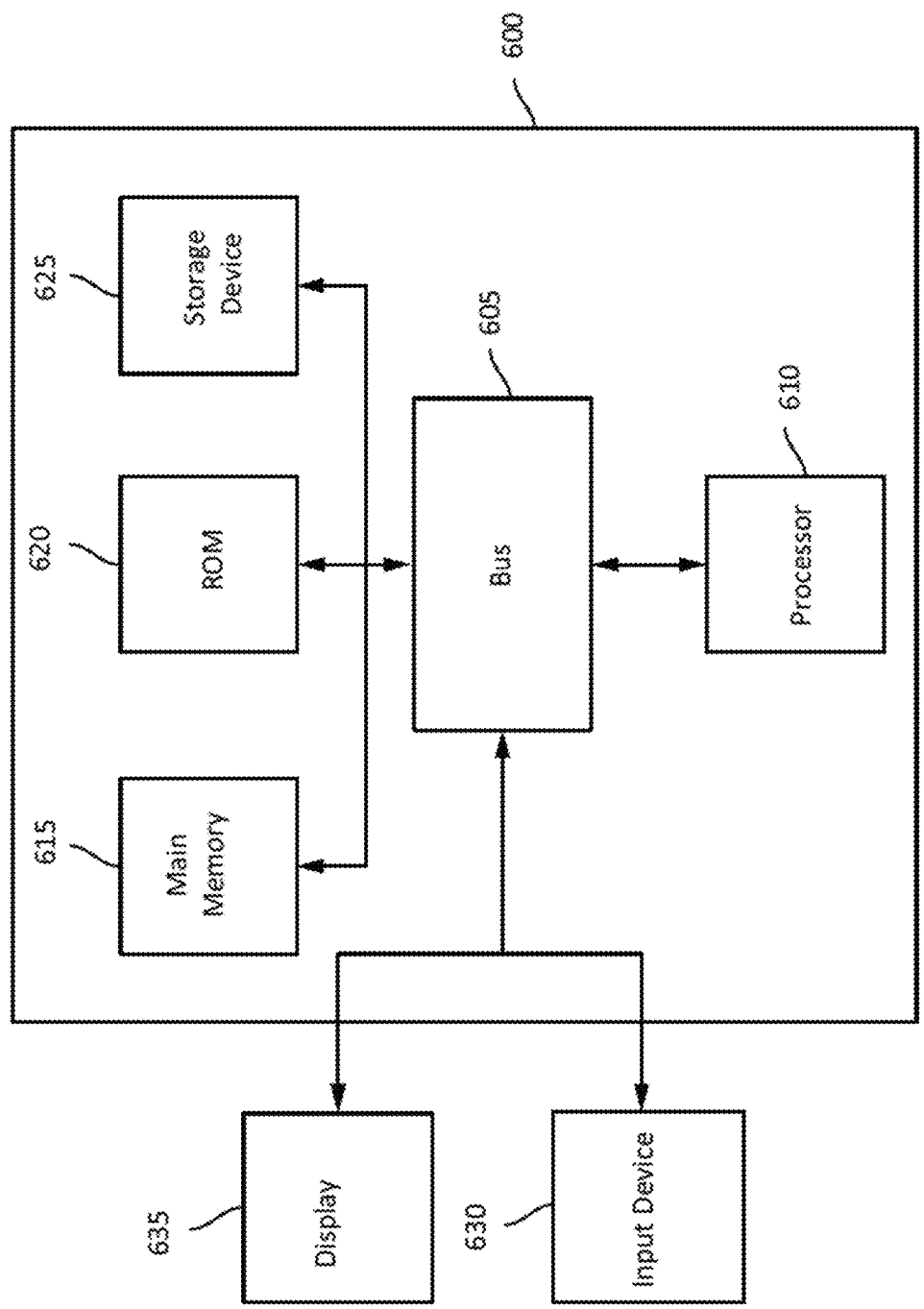
FIG. 6 is a block diagram illustrating an architecture for a computer system that can be employed to implement elements of the systems and methods described and illustrated herein.

FIG. 6 is a block diagram illustrating an architecture for a computer system 600 that can be employed to implement elements of the systems and methods described and illustrated herein. The computer system or computing device 600 can include or be used to implement a controller 102 or its components, and components of the vehicle. The computing system 600 includes at least one bus 605 or other communication component for communicating information and at least one processor 610 or processing circuit coupled to the bus 605 for processing information. The computing system 600 can also include one or more processors 610 or processing circuits coupled to the bus for processing information. The computing system 600 also includes at least one main memory 615, such as a random access memory (RAM) or other dynamic storage device, coupled to the bus 605 for storing information, and instructions to be executed by the processor 610. The main memory 615 can be used for storing information during execution of instructions by the processor 610. The computing system 600 can further include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions (e.g., for the data repository 120).

The computing system 600 can be coupled via the bus 605 to a display 635, such as a liquid crystal display, or active matrix display. An input device 630, such as a keyboard or mouse can be coupled to the bus 605 for communicating information and commands to the processor 610. The input device 630 can include a touch screen display 635.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement can also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining can be stationary (e.g., permanent or fixed) or moveable (e.g., removable or releasable). Such joining can be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling can be mechanical, electrical, or fluidic. For example, circuit A communicably "coupled" to circuit B can signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements can differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 100 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A multi-fuel vehicle comprising:
an engine configured to receive a cracked gas mixture;
a hydrogen reservoir coupled with the engine;
a cracker coupled with the hydrogen reservoir, with the hydrogen reservoir between the cracker and the engine, the cracker configured to:
receive ammonia from an ammonia storage container and energy from one or more energy sources;
crack the ammonia to form cracked gas comprising hydrogen gas and a nitrogen gas; and
convey the hydrogen gas to the hydrogen reservoir;
the one or more energy sources configured to provide the energy to the cracker; and
a controller configured to:
receive a predefined route for the multi-fuel vehicle;
predict a future load demand of the multi-fuel vehicle based on the predefined route;
determine a first quantity of hydrogen demand based on the future load demand of a time period;
determine a quantity of ammonia configured to generate the first quantity of hydrogen;
determine a flow rate of ammonia to deliver the quantity of ammonia to the cracker prior to the completion of the time period;
generate a control signal to adjust the flow rate of ammonia delivered to the cracker to generate an amount of hydrogen gas exceeding the quantity of hydrogen demand, to cause the hydrogen gas to accumulate in the hydrogen reservoir; and
provide, subsequent to the time period, a portion of the amount of hydrogen gas which exceeds the hydrogen demand to the engine, with the cracker in a non-operating state.

2. The multi-fuel vehicle of claim 1, wherein:
the one or more energy sources comprises a battery and exhaust heat;
the cracked gas mixture comprises a hydrocarbon fuel; and
the controller is configured to provide the energy to the cracker based on the future load demand.

3. The multi-fuel vehicle of claim 2, wherein the controller is configured to charge the battery based on the future load demand.

4. The multi-fuel vehicle of claim 2, wherein the battery is configured to receive the energy from a traction motor.

5. The multi-fuel vehicle of claim 1, wherein the predefined route includes an indication of a grade and a speed.

6. The multi-fuel vehicle of claim 1, wherein:
the multi-fuel vehicle is one locomotive of a plurality of locomotives of a locomotive consist, employing a distributed power system; and
the future load demand is based on a distribution of power between the plurality of locomotives by the distributed power system.

7. The multi-fuel vehicle of claim 1, wherein:
the engine is configured to receive the ammonia; and
the controller is configured to adjust a flow rate of the ammonia received by the engine based on a quantity of the hydrogen gas in the hydrogen reservoir.

8. A method for operating an ammonia cracker in a vehicle having a hydrogen reservoir and an engine, the method comprising:
receiving, by a controller of the vehicle, a predefined route;
predicting, by the controller, a future load demand of the vehicle based on the predefined route;
determining, by the controller, a first quantity of hydrogen demand based on the future load demand of a time period;
determining, by the controller, a quantity of ammonia configured to generate the first quantity of hydrogen;
determining, by the controller, a flow rate of ammonia to deliver the quantity of ammonia to the cracker prior to the completion of the time period;
generating a control signal to adjust, by the controller, the flow rate of ammonia delivered to the ammonia cracker of the vehicle to generate an amount of hydrogen gas exceeding the quantity of hydrogen demand, to cause at least a portion of the hydrogen gas to accumulate in the hydrogen reservoir;
receiving, at the ammonia cracker, ammonia at the adjusted flow rate from an ammonia storage container and energy from one or more energy sources;
cracking, by the ammonia cracker, the ammonia to form a cracked gas comprising the hydrogen gas and a nitrogen gas;
conveying, by the ammonia cracker, the hydrogen gas to the engine; and
combusting, by the engine, a cracked gas mixture comprising the hydrogen gas.

9. The method of claim 8, wherein receiving, at the ammonia cracker, the energy from the one or more energy sources comprises:
receiving, at the ammonia cracker, the energy from at least one of exhaust heat or a battery configured to receive energy from a traction motor; and
combusting the cracked gas mixture comprises combusting a hydrocarbon fuel.

10. The method of claim 9, wherein the method includes:
charging the battery based on the future load demand; and thereafter
conveying the energy, from the battery, to a resistive element thermally coupled to a reactor of the ammonia cracker.

11. The method of claim 8, comprising:
separating, by the ammonia cracker, at least a portion of the hydrogen gas from the cracked gas prior to its combustion.

12. The method of claim 8, wherein the predefined route includes an indication of a grade and a speed, and comprising:
determining a position of the vehicle relative to the predefined route; and adjusting a power generated by the engine responsive to the position.

13. The method of claim 8 comprising:
receiving, from a distributed power system, an indication of a distribution of power between a plurality of locomotives of a locomotive consist; and
determining the future load demand based on the distribution of the power.

14. The method of claim 8, comprising:
combusting, by the engine, the ammonia; and
adjusting the flow rate of the ammonia based on a quantity of the hydrogen gas stored and a state of the one or more energy sources.

15. A non-transient computer readable medium comprising instructions stored thereon that, when executed by a processor for a vehicle, cause the processor to:
receive a predefined route for a vehicle comprising an engine, a cracker, and a hydrogen reservoir therebetween;
predict a future load demand of the vehicle based on the predefined route;
determine a first quantity of hydrogen demand based on the future load demand of a time period;
determine a quantity of ammonia configured to generate the first quantity of hydrogen;
determine a flow rate of ammonia to deliver the quantity of ammonia to the cracker prior to the completion of the time period;
generate a control signal to adjust the flow rate of ammonia delivered to the cracker to generate an amount of hydrogen gas exceeding the quantity of hydrogen demand, to cause the hydrogen gas to accumulate in the hydrogen reservoir; and
generate a control signal to cause the cracker to receive ammonia at the adjusted flow rate.

16. The non-transient computer readable medium of claim 15, comprising instructions to:
charge a battery based on the future load demand;
cause the cracker to crack the ammonia to form a cracked gas comprising the hydrogen gas generated by the cracker and a nitrogen gas;
cause the cracker to convey the hydrogen gas generated by the cracker to the engine; and
cause the engine to combust the hydrogen gas generated by the cracker along with a hydrocarbon fuel.

17. The non-transient computer readable medium of claim 16, comprising instructions to:
generate energy to charge the battery from a traction motor.

18. The non-transient computer readable medium of claim 15, wherein the predefined route includes an indication of a grade and a speed, and wherein the instructions cause the processor to predict the future load demand of the vehicle based on the grade and the speed.

19. The non-transient computer readable medium of claim 15, wherein:
the vehicle is one locomotive of a plurality of locomotives of a locomotive consist employing a distributed power system; and
the instructions are configured to cause the processor to predict the future load demand based on a distribution of power between the plurality of locomotives by the distributed power system.

20. The non-transient computer readable medium of claim 15, wherein:
the engine is configured to receive the ammonia; and
the non-transient computer readable medium comprises instructions to:
adjust a flow rate of the ammonia received by the engine based on a quantity of the hydrogen gas in the hydrogen reservoir.

* * * * *